United States Patent [19]

Lindtveit

[11] 4,381,019

[45] Apr. 26, 1983

[54] PRESSURE RESPONSIVE VALVE

[75] Inventor: Herbert E. Lindtveit, Centerport, N.Y.

[73] Assignee: Sid Harvey, Inc., Valley Stream, N.Y.

[21] Appl. No.: 280,893

[22] Filed: Jul. 6, 1981

[51] Int. Cl.³ .......................................... F16K 15/14
[52] U.S. Cl. ................................... 137/843; 137/529; 137/536
[58] Field of Search ............... 137/529, 536, 539, 843

[56] References Cited

U.S. PATENT DOCUMENTS

| 909,886 | 1/1909 | Gold | 137/529 |
|---|---|---|---|
| 1,515,999 | 11/1924 | Clark | 137/843 |
| 3,077,204 | 2/1963 | Bennett et al. | 137/843 |
| 3,101,739 | 8/1963 | Pribonic | 137/529 |
| 3,498,321 | 3/1970 | Barrett et al. | 137/843 |
| 3,560,267 | 2/1971 | Guilliams | 137/843 |
| 3,970,106 | 7/1976 | Harris | 137/843 |

FOREIGN PATENT DOCUMENTS

| 692610 | 6/1953 | United Kingdom | 137/529 |
|---|---|---|---|
| 986277 | 3/1965 | United Kingdom | 137/843 |

*Primary Examiner*—Arnold Rosenthal
*Assistant Examiner*—Sheri M. Novack
*Attorney, Agent, or Firm*—Cooper, Dunham, Clark, Griffin & Moran

[57] ABSTRACT

This drip preventing valve is adapted to be installed in a conduit between the discharge outlet of an oil burner pump and the nozzle. The valve responds to the pressure in that conduit and closes whenever the pump stops, thereby preventing leakage or dripping from the nozzle. This valve consists of a body of one or more closed, flexible-walled cells, filled with air at atmospheric pressure. When the valve body is subjected to a greater pressure, it is compressed, thereby opening the valve. When that greater pressure is relieved, the valve closes.

7 Claims, 11 Drawing Figures

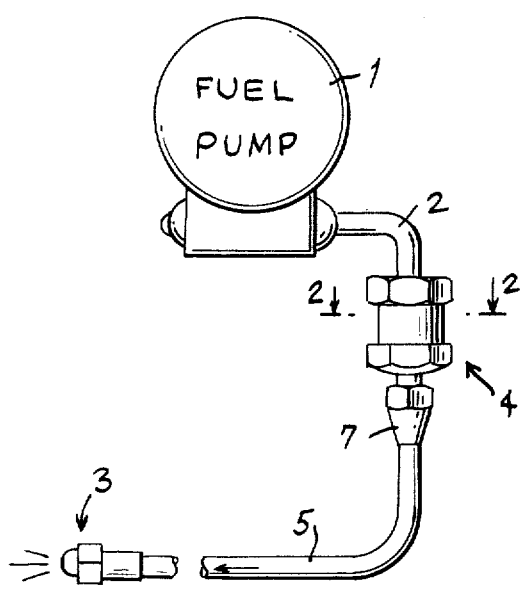
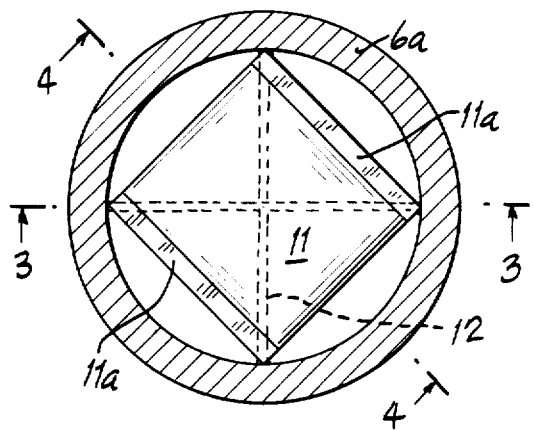
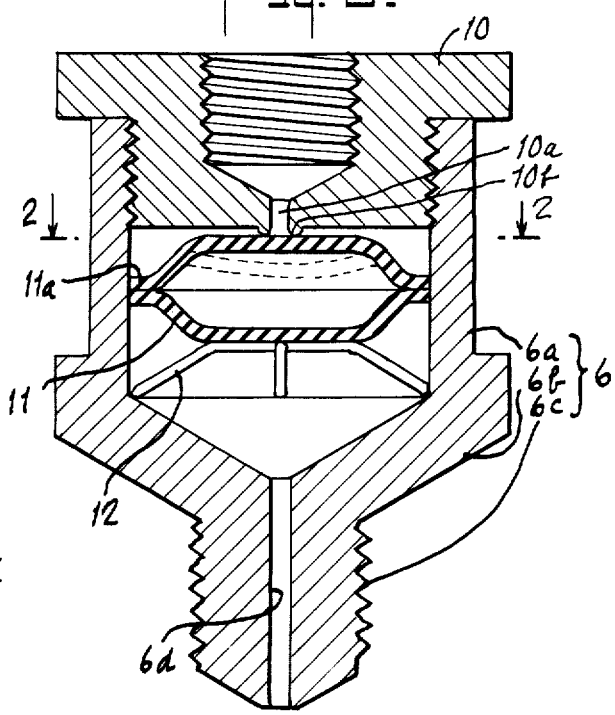
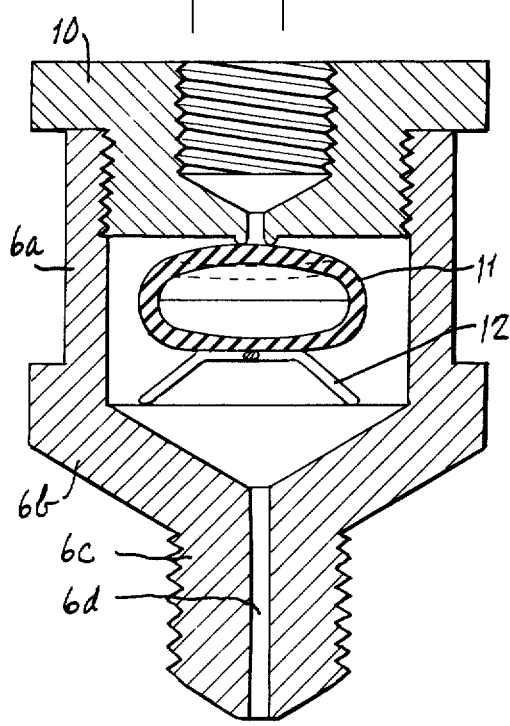
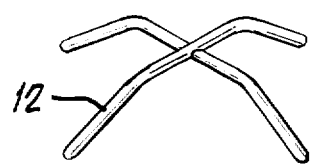

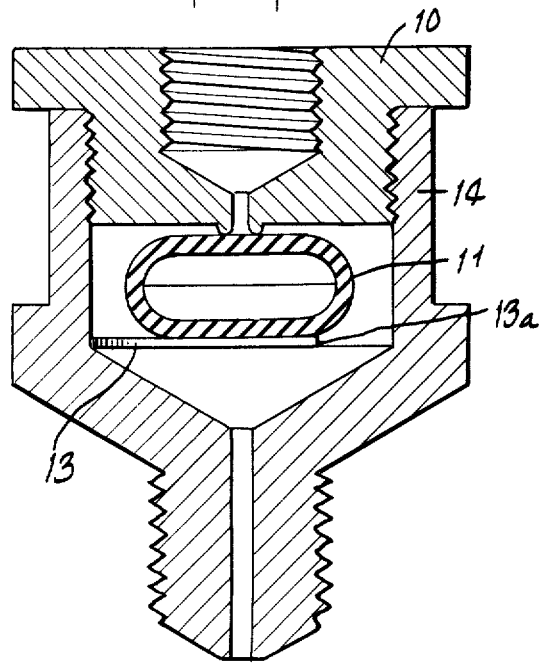
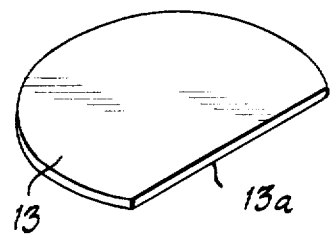
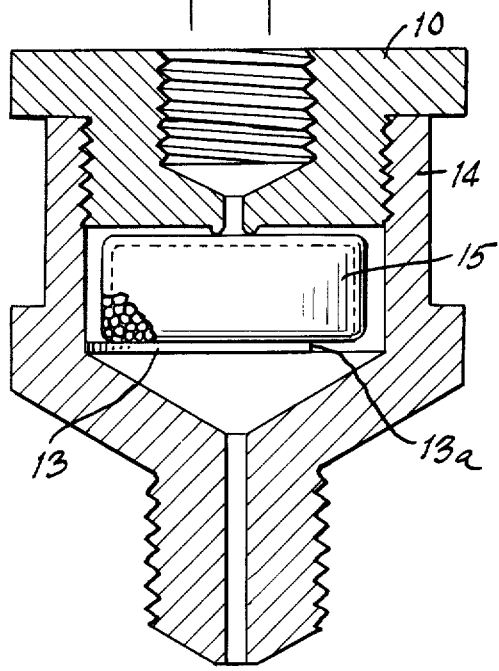
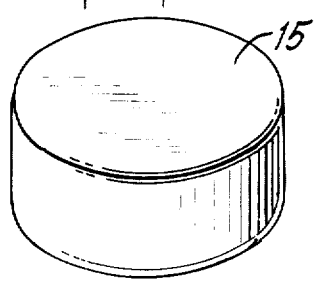
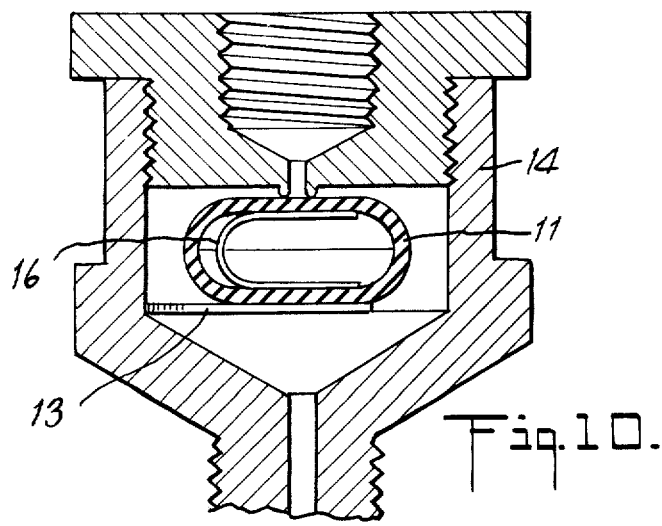
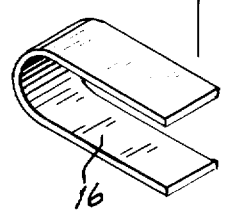

PRESSURE RESPONSIVE VALVE

BRIEF SUMMARY

This drip-preventing valve comprises a closed, gas-filled, flexible-walled, cell means which acts both as the valve and the valve actuator. The cells means may be a single cell made by taking a short section of plastic tubing and flattening and sealing its ends. Alternatively, the valve may comprise a body of closed cell foam sponge. In either case, the cell means is filled with air at atmospheric pressure. The cell means is held slightly compressed between a valve seat and a restraining surface, thereby holding the valve closed. When the cell means is subject to pressure greater than atmospheric, it is compressed further and separates from the valve seat, thereby opening the valve. When the high pressure ceases, the cell means expands again and closes the valve. In one embodiment, the closing action of the valve is aided by a spring confined within a cell.

DRAWINGS

FIG. 1 is a partly diagrammatic illustration of one embodiment of the invention as applied to the discharge line of a fuel pump.

FIG. 2 is a cross-sectional view taken on the line 2—2 of FIG. 1.

FIG. 3 is a cross-sectional view taken on the line 3—3 of FIG. 2.

FIG. 4 is a cross-sectional view taken on the line 4—4 of FIG. 2.

FIG. 5 is a perspective view of a spider forming part of the valve of FIGS. 1-4.

FIG. 6 shows a modified form of valve.

FIG. 7 is a perspective view showing a modified form of valve restraining member.

FIG. 8 is a view similar to FIGS. 2-6, showing another modification.

FIG. 9 is a perspective view of a cylindrical foam sponge valve member used in FIG. 8.

FIG. 10 is a view similar to FIG. 6, showing another modification.

FIG. 11 is a perspective view of a spring used in the valve of FIG. 10.

DETAILED DESCRIPTION

FIG. 1

FIG. 1 shows a fuel pump, such as the pump used to pump oil in a residential oil burning furnace, and generally indicated by numeral 1. Oil is delivered from the pump 1 through a conduit 2, a valve constructed in accordance with the invention and generally indicated at 4, and a conduit 5 to a nozzle 3.

FIGS. 2-5

The valve 4 comprises a fitting 6 having a wide diameter section 6a, which appears at the upper end of the fitting 6 in the drawing, a tapered section 6b, and a narrow diameter section 6c. The narrow diameter section 6c is externally threaded for attachment to a coupling shown at 7 in FIG. 1. Another fitting 10 is threadedly inserted into the upper end of the fitting 6. The fitting 10 is internally threaded for attachment to the conduit 2, and includes a central axial orifice 10a whose lower end is encircled by a seat 10b. A single cell valve body 11 is located within a chamber defined by the fittings 6 and 10. The lower end of the cell 11, as it appears in FIGS. 3 and 4, is restrained by a member 12, best seen in FIG. 5, and shown as a spider having four legs, which engage the bottom of the wide diameter section 6a, where the tapered section 6b forms an internal shoulder.

The cell 11 is formed by taking a short section of tubing of plastic material, e.g., polyurethane, squeezing the ends together and bonding them, as shown at 11a in FIGS. 2 and 3. The proportions of the spider 12, the cell 11 and the fitting 6 are chosen so that under atmospheric pressure conditions, the cell is in the position illustrated in FIG. 3 and is compressed slightly, with its upper wall firmly pressed against the seat 10b, so that the valve is closed. The cell 11 shown engages the wide diameter section 6a only at the corners of the cell so that fluid can readily pass by the cell on all sides thereof. See FIG. 4. A somewhat smaller or larger cell could be used.

When the pump starts, fluid under pressure is discharged through the orifice 10a and the increased pressure partially collapses the cell 11, thereby opening the valve and allowing the fuel to flow through the fitting 6 to the passage 6d at the lower end thereof. As soon as the pump stops, the air inside the cell 11, which has been compressed, expands, thereby forcing the upper wall of the nozzle against the seat 10b and preventing any loss of fluid, which might otherwise fall by gravity out through the nozzle 3.

The valve structure shown in FIGS. 2-5 is insensitive to its orientation, and is also insensitive to the direction of flow. However, if it is used where the parts are inverted from the positions shown in FIGS. 2-5, and if the direction of flow is reversed, it may be desirable to bond the wall of the cell 11 to the restraining member 12.

FIGS. 6-7

The parts in this figure are generally similar to those in FIGS. 2-5 except that the restraining spider 12 is replaced by a part circular disk 13 cut away along one secant thereof. This arrangement allows for a shorter fitting 14 to replace the fitting 6. Note that the vertical dimension of the fitting 14 in FIG. 6 is shorter than the vertical dimension of the fitting 6 in FIG. 2.

Instead of using the spider 12 or the disk 13, the cell may be restrained by a suitably configured integral portion of the fitting 6.

FIGS. 8-9

These figures illustrate a modification in which the single cell valve body 11 of the preceding figures is replaced by a body 15 of foam sponge having multiple closed cells. The body 15 may be cylindrical, as shown in FIGS. 8 and 9, and preferably has an outside diameter at atmospheric pressure smaller than the inside diameter of the fitting 14 within which it is located.

FIGS. 10-11

These figures illustrate a modification similar to that of FIGS. 6 and 7. In these figures a C-shaped spring 16 is inserted in the cell 11 before it is sealed. The spring biases the cellular valve member to the closed position shown. Some plastic materials may not have a sufficient memory characteristic to restore themselves to the closed position immediately when the pump pressure is cut off, especially if they have been held in the compressed position for a long period. The spring 16 overcomes this deficiency and permits the use of a wider range of plastic materials for the construction of the single cell valve body means 11.

While the invention has been described as applied to an embodiment wherein the pressure inside the closed cell means is atmospheric, the invention is equally applicable to a situation where the pressure inside the cell means is either above or below atmospheric. The only requirement is that the cell or cells must be sealed when the pressure inside them is equal to the pressure at which the valve is required to remain closed.

I claim:

1. A drip preventing valve adapted for installation in a conduit (2,5) between a pump discharge outlet and a nozzle (3), comprising:
   a. a first pipe fitting (6,14) having an open end and an opposite end adapted for connection to said conduit;
   b. a second pipe fitting (10) extending within said open end of the first fitting and cooperating with said first fitting to define a chamber, said second fitting having an inner end with a valve port (10a) encircled by a valve seat (10b), and an outer end attachable to said conduit for fluid communication therewith;
   c. closed, flexible-walled, gas-filled cell means (11,15) within the chamber, said cell means being a single cell (11) formed of a section of flexible tubing flattened and sealed at its ends; and
   d. means in the chamber opposite the seat and limiting the movement of the cell means in a direction away from the seat, said cell means having an unstressed dimension in said direction greater than the distance between the seat and said movement limiting means, so that when the pressure within the cell means is at least equal to the pressure in the chamber, the cell means engages the seat and closes the valve port, said cell means being compressed when the pressure in the chamber is greater than the pressure in the cell means to decrease said dimension of the cell means and open the valve port.

2. A valve as in claim 1, in which each diagonal of the single cell is equal to or less than the inside diameter of the first fitting.

3. A valve as in claim 1, in which said tubing is of flexible plastic material.

4. A valve as in claim 3, in which said material is polyurethane.

5. A valve as in claim 1, in which the tubing ends are sealed when the tubing is filled with air at atmospheric pressure.

6. A valve as in claim 1, including a U-shaped spring inside the single cell and biasing its opposite flattened walls apart.

7. A valve as in claim 1. in which:
   a. said first fitting has a cylindrical interior and an internally projecting shoulder spaced from and facing the seat; and
   b. said movement limiting means comprises a part-circular disk (13) engaging the shoulder and cut away at least along one secant to provide an aperture in its periphery for the passage of fluid.

* * * * *